United States Patent [19]

Hansson

[11] Patent Number: 4,998,488
[45] Date of Patent: Mar. 12, 1991

[54] AGRICULTURAL COMBINED DRILL DISPENSER

[76] Inventor: Kurt Hansson, Norrbäck, S-73300 Sala, Sweden

[21] Appl. No.: 424,209
[22] PCT Filed: Feb. 19, 1988
[86] PCT No.: PCT/SE88/00073
  § 371 Date: Oct. 16, 1989
  § 102(e) Date: Oct. 16, 1989
[87] PCT Pub. No.: WO88/05997
  PCT Pub. Date: Aug. 25, 1988

[30] Foreign Application Priority Data

Feb. 19, 1987 [SE] Sweden ................ 8700681

[51] Int. Cl.⁵ .............. A01C 7/06; A01C 5/08; A01B 49/06
[52] U.S. Cl. .............. 111/187; 111/121; 111/167; 172/558; 172/754
[58] Field of Search .............. 111/121, 73, 80, 163, 111/167, 168, 169, 186–188; 172/558, 741, 754, 709, 705, 182, 183

[56] References Cited

U.S. PATENT DOCUMENTS

| | | | |
|---|---|---|---|
| 904,410 | 11/1908 | Collins | 111/186 X |
| 1,006,771 | 10/1911 | Metzler | 111/186 X |
| 1,026,409 | 5/1912 | Schutt | 111/168 |
| 2,042,014 | 5/1936 | Michael et al. | 111/186 X |
| 2,058,539 | 10/1936 | Welty et al. | 111/186 X |
| 2,691,353 | 10/1954 | Secondo | 111/186 X |
| 2,734,439 | 2/1956 | Padrick | 111/121 X |
| 2,808,792 | 10/1957 | Brickman | 111/186 |
| 2,861,527 | 11/1958 | Phillips | 111/186 |
| 2,869,489 | 1/1959 | Buhr | 111/186 X |
| 3,213,812 | 10/1965 | Forsyth et al. | 111/186 X |
| 3,396,685 | 8/1968 | Meiners | 111/187 X |
| 4,196,679 | 4/1980 | Moore | 111/167 X |
| 4,275,671 | 6/1981 | Baker | 111/186 X |
| 4,388,878 | 6/1983 | Demzin | 111/73 X |
| 4,760,806 | 8/1988 | Bigbee et al. | 111/167 |
| 4,762,075 | 8/1988 | Halford | 111/187 X |

FOREIGN PATENT DOCUMENTS

| | | | |
|---|---|---|---|
| 204578 | 8/1956 | Australia | 111/186 |
| 3332964 | 1/1985 | Fed. Rep. of Germany | |
| 2408288 | 6/1979 | France | |
| 207509 | 12/1967 | U.S.S.R. | 111/186 |
| 397149 | 9/1973 | U.S.S.R. | 111/187 |
| 491340 | 11/1975 | U.S.S.R. | 111/186 |
| 904542 | 2/1982 | U.S.S.R. | 111/186 |
| 745484 | 2/1956 | United Kingdom | 172/705 |
| 2060340 | 5/1981 | United Kingdom | 111/187 |

OTHER PUBLICATIONS

Conserva Pak Seeder from Vale Farms Ltd., P.O. Box 417, Indian Head, Sask, Canada, Sales Leaflet, Jun. 1984.

Primary Examiner—Danton D. DeMille
Attorney, Agent, or Firm—Dowell & Dowell

[57] ABSTRACT

Apparatus in an agricultural combination machine for simultaneously inserting and positioning in the earth of at least two components, e.g. seed and fertilizer, primarily a combination machine for direct sowing on a field without previous soil cultivation of the ground by ploughing, harrowing or the like, and including a means cutting the earth, e.g. a disc coulter, a knife coulter or the like, and at least two tubular discharge means, one for each component, the cutting means and discharging means extending down into the earth under the earth surface. The means for cutting (2) and means for discharge (5, 6) are removably attached to a coulter arm (1) and to each other to be allowed displacement upwards and downwards such that they are mutually relatively adjustable in depth to given working depths under the earth surface.

7 Claims, 2 Drawing Sheets

AGRICULTURAL COMBINED DRILL DISPENSER

BACKGROUND OF THE INVENTION

1. Field of the Invention

The invention relates to a combined machine in accordance with the preamble to claim 1.

2. History of the Related Art

Combined machines for simultaneous spreading of seed and commercial fertilizer in agriculture are known, e.g. from the U.S. Pat. No. 3,213,812, which illustrates an apparatus with two mutually, relatively fixed outlet nozzles, arranged side by side and at different working depths under the earth surface. One condition for the apparatus is that earth can be led in between the nozzles (see FIG. 5 of the patent specification), i.e. that the apparatus is intended for fields which are worked by ploughing and harrowing, or in some other way. For sowing seed directly into place in the earth, i.e. farming without ploughing it has been necessary to supply fertilizer in a separate pass or on top of the earth. In addition, the combination sowing machines have only been able to place fertilizer between alternate rows of seed.

Another known technique is apparent from SE 130,953, which is an apparatus for use in sowing directly onto unworked ground.

SUMMARY OF THE INVENTION

The object of the invention is to solve the above mentioned problems and to develop an apparatus for combined dispensing, e.g. of seed and fertilizer in direct sowing by simultaneous insertion into the earth and such that the distance laterally between seed and fertilizer may be varied to desired values, while the depths of insertion under the earth surface can be adjusted to different, desired values quite independent of each other. This signifies a great advantage, since different combinations of seed types and fertilizer types as well as the character and composition of different earths require different procedures for dispensing and distribution.

The object is achieved by the invention having been given the characterizing features disclosed in the claims.

BRIEF DESCRIPTION OF THE DRAWINGS

The invention will now be described with the aid of an embodiment example and in connection with the attached drawings, where.

DESCRIPTION OF THE PREFERRED EMBODIMENT

Figure 1:
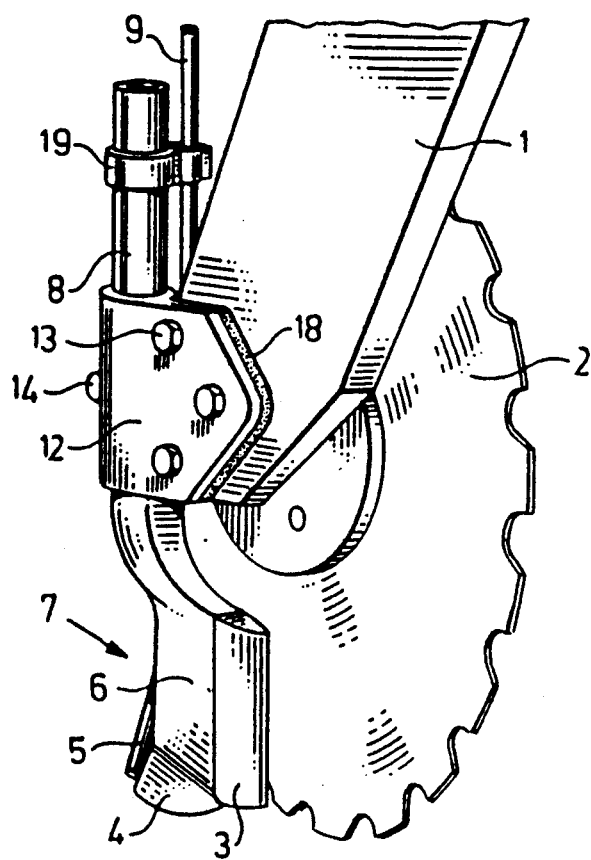
FIG. 1 is a perspective view of the apparatus seen obliquely from the front in relation to the working direction.

In FIG. 1 the numeral 1 denotes the coulter arm of a disc coulter 2 and a combination share 7, including a discharge pipe 5 for fertilizer and a discharge pipe 6 for seed. Seed and fertilizer are fed to the outlet means 6 and 5 via the feed pipes 8 and 9. The clamp 12 is connected to the coulter arm 1 with the aid of three screws 13. An elastic element 18, e.g. of rubber, is arranged between the clamp 12 and the arm 1. The position and direction of the combination share 7 can be varied within certain limits by tightening the three screws 13 to different amounts. A clip 19 is provided for keeping the feed pipes 8 and 9 together.

FIG. 1 also illustrates a share 3, which is fixed to the forward portion of the discharge pipe 6 for seed, and this pipe has a forwardly-downwardly directed share 4 at its lower portion. When the share moves in the working direction 15 through the earth, the share 4 will be subjected to a downwardly directed force. This facilitates the travel of the feed means in earth which is hard or which contains plant residue.

Figure 2:
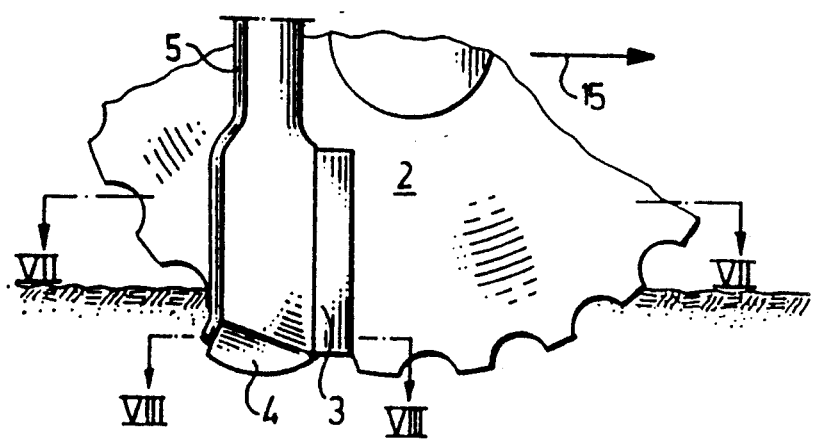
FIG. 2 illustrates the lower part of the apparatus in FIG. 1 seen from one side.

In FIG. 2 the denotations are the same as in FIG. 1 for the same details, and the arrow 15 denotes the working direction of the disc coulter 2.

Figure 3:
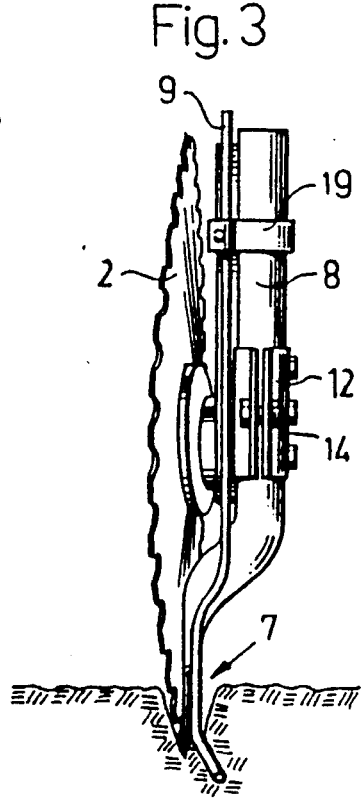
FIG. 3 illustrates the apparatus from behind.

FIG. 3 illustrates the clamp 12 from behind and how it connects the details 3-9 to the arm 1 with the aid of a bolted joint 14. By loosening the bolted joint 14, the discharge pipe 6 and feed pipe 8 for seed, as well as the discharge pipe 5 and feed pipe 9 for fertilizer may be moved both vertically and laterally for being reclamped in new positions relative each other and the arm 1.

Figure 4:
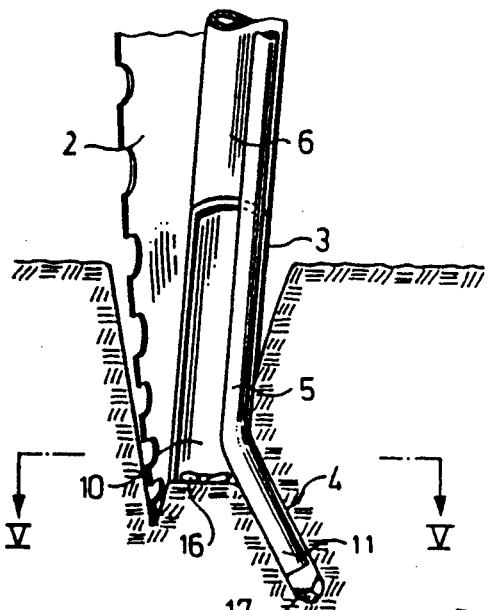
FIG. 4 is a partially sectioned view transverse the working direction of the bottom most part of the apparatus in FIG. 3 while working in the ground.

FIG. 4 illustrates the apparatus in more detail where, apart from previous details, the outlet opening for seed is denoted by the numeral 10 and the outlet opening for fertilizer is denoted by 11. The dispensed seed is denoted by 16 and the dispensed fertilizer by 17. In an actual case, the lateral distance between seed and fertilizer can be up to 20-40 mms. Depending on the type of seed and fertilizer, as well as the properties of the earth, a suitable lateral distance can be given other values. The dispensing depth for seed may be 30-40 mms and for fertilizer 50-80 mms. Of course, these values can also be varied depending on circumstances. Usually, the difference between dispensing depths for seed and fertilizer is from 20 to 60 mms, the fertilizer share 4 then being at the greater depth.

The disc coulter 2 opens a furrow in the unworked ground. The combination share 7 operates in this furrow, the fertilizer discharge pipe 5, its feed pipe 9 and the lower part of the pipe 6 being situated in a protected position behind the seed share 3 when the combination share 7 traverses the ground in the working direction.

Figure 5:
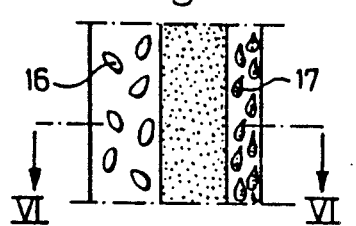
FIG. 5 is a section according to V—V in FIG. 4 after the apparatus has completed dispensing at different depths.

FIG. 5 illustrates how the seed 16 and fertilizer 17 are placed side by side, although at different depths as will be seen from FIG. 4.

Figure 6:
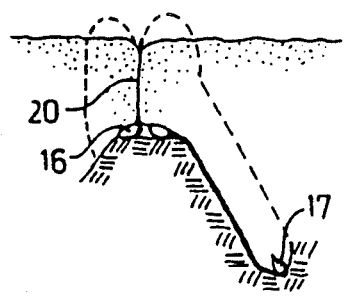
FIG. 6 is a schematic view from above, illustrating lateral dispensing according to VI—VI in FIG. 5.

FIG. 6 illustrates how seed 16 and fertilizer 17 are situated in relation to each other and to the earth surface after the disc coulter 2 and combination share 7 have passed, and how the furrow that has been made has closed at an interface 20.

Figure 7:
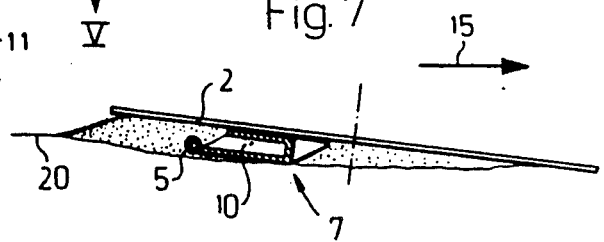
FIG. 7 is a section seen from above according to VII—VII in FIG. 2.

FIG. 7 is a section through the apparatus just above the earth surface, as is denoted in FIG. 2 by the section VII—VII. The interface 20 left behind by the furrow is formed at a short distance behind the disc coulter 2 and combination share 7.

Figure 8:
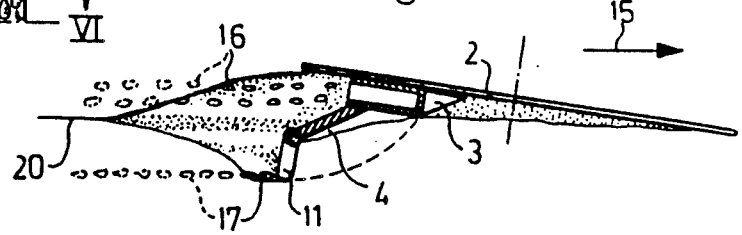
FIG. 8 is a corresponding view according to VIII—VIII in FIG. 2.

FIG. 8 is a section through the combination share 7 during its operation and just under the earth surface, see section VIII—VIII in FIG. 2. Seed 16 and fertilizer 17 have been dispensed and the furrow is in the process of closing into the interface 20 above seed and fertilizer.

Within the scope of the invention, one skilled in the art can achieve other embodiments than the one illustrated for the purpose of examplification. For example, the discharge means may comprise a so-called broad show coulter for band drilling or a "Duck foot" share, which can have a broad share for broadcast seeding.

I claim:

1. A combination agricultural apparatus for substantially simultaneously cutting into the soil and implanting seeds and fertilizer and which is mounted to a coulter arm comprising, a cutting means mounted to the coulter arm for forming a cut in the soil, a first discharge means for discharging seeds into the soil, a clamp means for vertically adjustably mounting said first discharge means to the coulter arm so as to be adjacent said cutting means, first adjustable means for securing said clamp means to the coulter arm and second adjustable means for securing said first discharge means to said clamp means, a second discharge means for discharging fertilizer into the soil, clip means for mounting said second discharge means relative to said first discharge means, said first discharge means having a lower end extending within the cut in the soil, said second discharge means being adjacent to said cutting means and said first discharge means and having a lower end which is horizontally spaced relative to said lower end of said first discharge means, said first adjustable means including an elastomeric element mounted between said clamp means and the coulter arm and a plurality of adjustable bolts extending through said clamp means and said elastomeric element and into the coulter arm, said bolts being selectively adjustable to compress the elastomeric element to thereby laterally deflect said first discharge means with respect to the coulter arm, whereby said lower ends of said first and second discharge means may be selectively vertically adjusted relative to one another within the cut in the soil so that the fertilizer may be deposited substantially simultaneously with the seed but at different depths within the soil.

2. The combination agricultural apparatus of claim 1 in which said first and second discharge means are mounted behind said cutting means.

3. The combination agricultural apparatus of claim 1 in which said lower end of said second discharge means is spaced at a greater working depth then said lower end of said first discharge means.

4. The combination agricultural apparatus of claim 3 in which said lower end of said second discharge means extends horizontally outwardly with respect to said lower end of said first discharge means at a distance of between 10 to 40 mms and extends approximately 20 to 60 mms vertically beyond said lower end of said first discharge means.

5. The combination agricultural apparatus of claim 3 in which said lower end of said first discharge means includes an outwardly extending share means to facilitate the movement of the first discharge means through the soil.

6. The combination agricultural apparatus of claim 1 in which said lower end of said first discharge means includes an outwardly extending share means to facilitate the movement of the first discharge means through the soil.

7. The combination agricultural apparatus of claim 6 including a second share means extending vertically upwardly relative to said first discharge means so as to extend forwardly of said first discharge means when said first discharge means is moved through the soil.

* * * * *